US009457458B2

(12) United States Patent
Wagstaff et al.

(10) Patent No.: US 9,457,458 B2
(45) Date of Patent: Oct. 4, 2016

(54) FASTENER REMOVAL

(71) Applicant: Airbus Operations Limited, Bristol (GB)

(72) Inventors: Lee Wagstaff, High Peaks (GB); Philip Lee Bradbury, Bramhall (GB); Gareth Towlson, Tarporley (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 427 days.

(21) Appl. No.: 13/915,058

(22) Filed: Jun. 11, 2013

(65) Prior Publication Data
US 2013/0327189 A1 Dec. 12, 2013

(30) Foreign Application Priority Data

Jun. 12, 2012 (GB) .................................. 1210331.3

(51) Int. Cl.
*B25B 19/00* (2006.01)
*B25B 27/18* (2006.01)
*B25D 17/02* (2006.01)
*F16B 37/14* (2006.01)

(52) U.S. Cl.
CPC ............... *B25B 19/00* (2013.01); *B25B 27/18* (2013.01); *B25D 17/02* (2013.01); *F16B 37/14* (2013.01); *Y10T 29/49822* (2015.01)

(58) Field of Classification Search
CPC ....... B25B 19/00; B25B 27/18; F16B 37/14; B25D 17/02
See application file for complete search history.

(56) References Cited

U.S. PATENT DOCUMENTS

| 2,896,985 | A | * | 7/1959 | Braatz | ..................... | B25B 13/06 |
| | | | | | | 279/30 |
| 5,737,981 | A | * | 4/1998 | Hildebrand | .................... | 81/53.2 |
| 7,261,506 | B2 | * | 8/2007 | Smolarek | ....................... | 411/161 |
| 2009/0218812 | A1 | * | 9/2009 | Gammons | ..................... | 285/308 |
| 2011/0061217 | A1 | * | 3/2011 | Shevela et al. | ................. | 29/235 |
| 2012/0055293 | A1 | * | 3/2012 | Urick et al. | ............... | 81/177.85 |

FOREIGN PATENT DOCUMENTS

WO 9729875 A1 8/1997

OTHER PUBLICATIONS

Search Report for Application No. GB1210331.3, dated Sep. 24, 2012.

* cited by examiner

*Primary Examiner* — Jacob Cigna
*Assistant Examiner* — Lee A Holly
(74) *Attorney, Agent, or Firm* — Hauptman Ham, LLP

(57) ABSTRACT

The present invention provides a method for removing a fastener from a component, the fastener comprising an end portion exposed from the component, the end portion having a threaded section, the method comprising the following steps; providing a cap with a threaded opening, screwing the threaded opening of the cap onto the threaded section of the exposed end portion of the fastener, and securing a percussive tool to the cap, such that repeated impacts from the percussive tool are directed onto the exposed end portion of the fastener. The present invention also provides a cap for use in removing a fastener from a component, the cap comprising a threaded opening for screwing onto a threaded section of an exposed end portion of the fastener, and an attachment portion for securing a percussive tool to the cap.

14 Claims, 5 Drawing Sheets

FASTENER REMOVAL

RELATED APPLICATIONS

The present application is based on, and claims priority from, British Application Number 1210331.3, filed Jun. 12, 2012, the disclosure of which is hereby incorporated by reference herein in its entirety.

BACKGROUND OF THE INVENTION

The present invention concerns fastener removal. More particularly, but not exclusively, this invention concerns a method for removing a fastener from a component. The invention also concerns a cap for use in removing a fastener from a component.

US 2012/0055293 discloses a tool for removing a seized fastener from a component. The tool comprises a rod driver and one or more interchangeable sockets. The sockets connect to one end of the driver and have different openings at their front ends for connecting over different size/shape bolt heads. The driver is designed to secure a pneumatic hammer at its other end. Shock waves are then sent into the bolt shank and thread areas via axial blows from the pneumatic hammer. The tool allows impacts to be centred on the bolt head without damaging the bolt head and without the driver jumping off the bolt.

However, the tool can only be used on bolts where the bolt head protrudes from the component. In other words, it cannot be used for sunken bolt heads or fasteners that do not have a bolt head, or similar.

Another method for removing a bolt is also known. This method involves drilling a hole through the centre of the bolt head (which may be sunken) and down into the shank of the bolt. The hole is then tapped to provide it with an internal thread. A mandrel is then screwed into the internally threaded hole, a spacer bush placed over the mandrel and a hydraulic puller tool is used to pull on the mandrel and thereby pull the bolt out from its hole in the component.

The bolt (still attached to the mandrel) is then placed back in the hole in the component in order to remove the bolt sleeve still in the component hole. A sleeve removal cap is then screwed onto the exposed tail of the bolt. The spacer bush is then placed over the mandrel and the hydraulic puller tool is used to pull the mandrel, and thereby the bolt, sleeve removal cap and the sleeve from the component hole.

A disadvantage of this method is that, although it can be used for fasteners with sunken bolt heads, it is very time consuming. For example, it can take approximately 5 hours to remove one bolt using this method. In addition, it requires drilling through and tapping inside a bolt, which cause damage to the bolt and introduce health and safety considerations. In addition, there is a risk of damage to the component itself. Furthermore, the pressure required to drill through the bolts can cause damage to the drill bits used.

The present invention seeks to mitigate the above-mentioned problems. Alternatively or additionally, the present invention seeks to provide an improved method for removing a fastener from a component.

SUMMARY OF THE INVENTION

The present invention provides, according to a first aspect, a method for removing a fastener from a component, the fastener comprising an end portion exposed from the component, the end portion having a threaded section, the method comprising the following steps; providing a cap with a threaded opening, screwing the threaded opening of the cap onto the threaded section of the exposed end portion of the fastener, and securing a percussive tool to the cap, such that repeated impacts from the percussive tool are directed onto the exposed end portion of the fastener.

Providing a cap with a threaded opening allows the cap to be screwed onto an exposed end portion of a fastener. For example, where the fastener is a bolt and the bolt head is sunken, it allows the cap to be screwed onto a tail of the bolt. Having a cap attached to the fastener allows a percussive tool to be secured to the cap and provide repeated impacts to the fastener to allow the fastener to be loosened, if it is seized, for example. The percussive tool may be secured to the cap by an attachment mechanism that attaches the percussive tool to the cap, whilst allowing the percussive tool to have a limited movement with respect to the cap. The percussive tool may be secured to the cap such that it is prevented from detaching from the cap. This means that repeated impacts from the percussive tool do not cause the percussive tool to become detached from the cap and allows repeated impacts from the percussive tool to be directed onto the exposed end portion of the fastener. As the percussive tool is secured to the cap, the repeated impacts are caused to only be directed onto the fastener and not onto the component, for example.

Preferably, the component is an aircraft component.

Preferably, the fastener is a bolt and wherein the method also comprises the step of unscrewing a nut from the exposed threaded section of the bolt.

Preferably, the percussive tool is secured to the cap by securing an impact member, which is secured to, and may be an integral part of, the percussive tool, in a hollow section of the cap, such that the impact member is adjacent to the exposed end portion of the fastener. Having the impact member adjacent to the fastener allows repeated impacts to be directed onto the fastener. Having a hollow section of the cap allows an impact member to be contained within the hollow section.

More preferably, the impact member is moveable inside the hollow section, to and from the exposed end portion of the fastener. This allows the impact member to be moved to and from the fastener by the percussion tool to provide repeated impacts directed onto the fastener.

More preferably, the impact member is rotatable inside the hollow section of the cap. This allows the percussive tool to be moved around in relation to the component by an operator during use.

Preferably, the percussive tool is secured to the cap by pushing the impact member through a resilient opening in the cap into the hollow section of the cap. This allows the impact member to be easily secured and removed from the cap, without the use of a separate clasp, or similar, that would need to be fastened and un-fastened during use.

Preferably, the percussive tool is secured to the cap by a rod, the rod being secured to the cap and also secured to the percussive tool. This allows the rod to be secured to the percussive tool and the cap in two separate stages. Hence, for example, the rod can be secured to the percussive tool and then push fitted into the resilient opening of the cap.

More preferably, the impact member is located on the rod and whereby the rod is secured to the cap by securing the impact member in the hollow section of the cap, such that the impact member is adjacent to the exposed end portion of the fastener.

Preferably, the method comprises the step of placing a protective washer around the exposed end portion of the fastener prior to screwing the threaded opening of the cap onto the exposed end portion of the fastener. The washer provides additional protection to prevent damage to the component.

Preferably, the method comprises the step of also removing a sleeve from the component by locating a sleeve removal dowel in the sleeve and pulling the sleeve removal dowel and the sleeve out of the component. This allows a sleeve to be removed in a similar way to the prior art.

According to a second aspect of the invention there is also provided a cap for use in removing a fastener from a component, the cap comprising a threaded opening for screwing onto a threaded section of an exposed end portion of the fastener, and an attachment portion for securing a percussive tool to the cap, such that, in use, repeated impacts from the percussive tool are directed onto the exposed end portion of the fastener.

Providing a cap with a threaded opening allows the cap to be screwed onto an exposed end portion of a fastener. For example, where the fastener is a bolt and the bolt head is sunken, it allows the cap to be screwed onto a tail of the bolt. Having a cap attached to the fastener allows a percussive tool to be secured to the cap and provide repeated impacts to the fastener to allow the fastener to be loosened, if it is seized, for example. The percussive tool may be secured to the cap by an attachment mechanism that attaches the percussive tool to the cap, whilst allowing the percussive tool to have a limited movement with respect to the cap. The percussive tool may be secured to the cap such that it is prevented from detaching from the cap. This means that repeated impacts from the percussive tool do not cause the percussive tool to become detached from the cap and allows repeated impacts from the percussive tool to be directed onto the exposed end portion of the fastener. As the percussive tool is secured to the cap, the repeated impacts are caused to only be directed onto the fastener and not onto the component, for example.

Preferably, the attachment portion of the cap comprises a hollow section for securing an impact member therein such that, in use, the impact member is adjacent to the exposed end portion of the fastener. Having the impact member adjacent to the fastener allows repeated impacts to be directed onto the fastener. Having a hollow section of the cap allows an impact member to be contained within the hollow section.

More preferably, the cap comprises a resilient opening to the hollow section. This allows the impact member to be easily secured and removed from the cap, without the use of a separate clasp, or similar, that would need to be fastened and un-fastened during use.

The invention also provides a tool assembly comprising a cap as described above, and an impact rod for connecting to the cap and to a percussive tool.

The invention also provides a method for removing a fastener from a component, as described above, whereby the method comprises using the cap or the tool assembly as described above.

It will of course be appreciated that features described in relation to one aspect of the present invention may be incorporated into other aspects of the present invention. For example, the method of the invention may incorporate any of the features described with reference to the cap or tool assembly of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
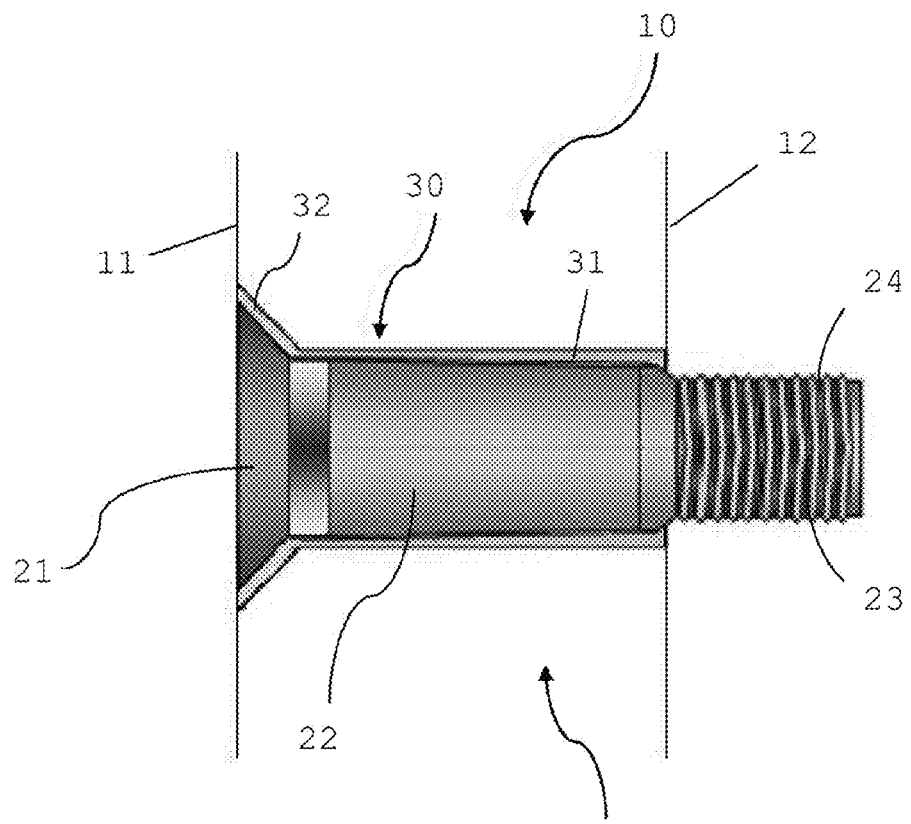
FIG. 1 shows a side sectional view of a bolt in a component.

FIG. 1 shows a side sectional view of a bolt 20 in a Carbon Fibre Reinforced Plastic (CFRP) component 10. The bolt 20 comprises a sunken tapered bolt head 21, flush with the front/head side 11 of the component 10, a cylindrical bolt shank 22 and a bolt tail 23 exposed from the rear/tail side 12 of the component 10. The bolt tail 23 has a threaded section 24 on it, which a nut (not shown) would have been screwed onto before being removed.

Surrounding the bolt head 21 and bolt shank 22 is a sleeve 30 in the component 10. The sleeve 30 comprises a tapered portion 32 to correspond with the tapered shape of the bolt head 21 and a cylindrical straight portion 31 corresponding to the shape of the bolt shank 22.

Figure 2:
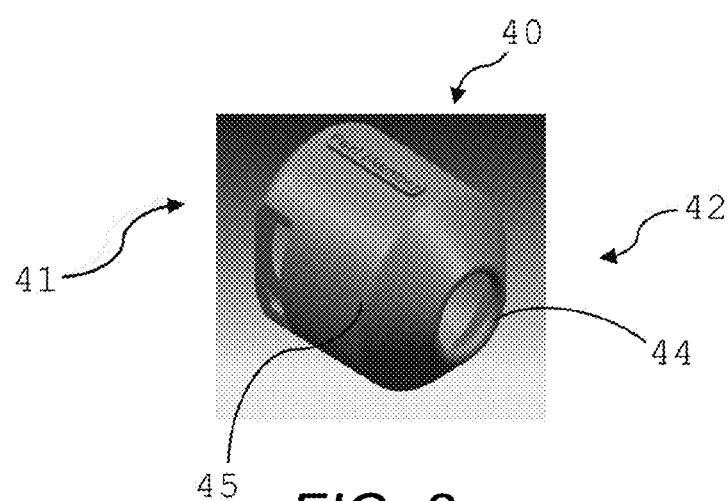
FIG. 2 shows a perspective view of a cap according to a first embodiment of the invention.
Figure 3:
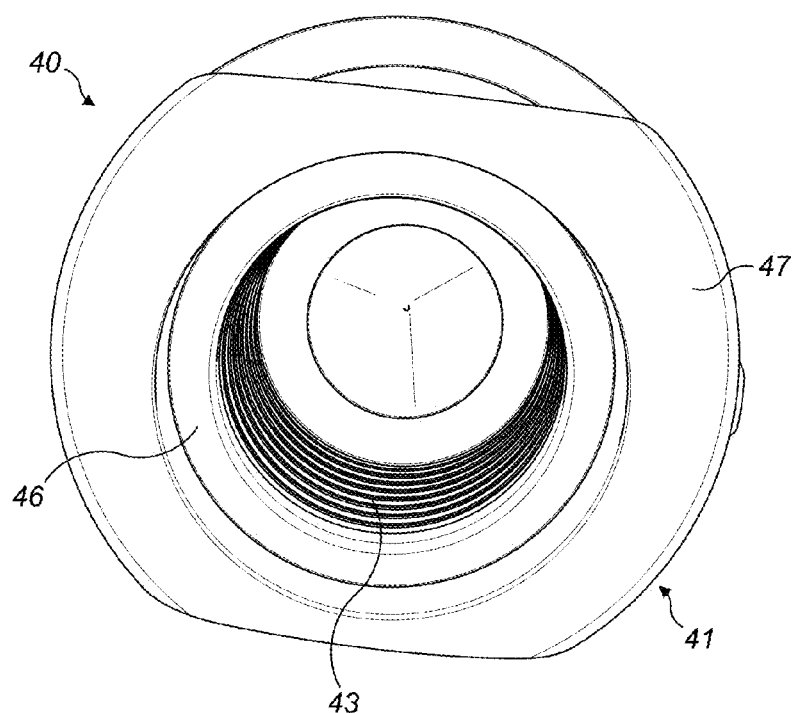
FIG. 3 shows a view of a first end of the cap of FIG. 2.

FIG. 2 shows a perspective view of a cap 40 according to a first embodiment of the invention and FIG. 3 shows a view of a first end 41 of the cap 40 of FIG. 2. The cap 40 comprises a first end 41 with a metallic threaded opening 43 and a second end 42 with a resilient opening 44. The threaded opening 43 corresponds to the threaded section 24 of the bolt tail 23. The cap is made of metal 46, covered with a resilient polyurethane material 47. It is the polyurethane material 47 that provides the opening 44 with its resilient, flexible nature. The cap 40 also comprises a hollow section 45 adjacent to the resilient opening 44.

Figure 4:
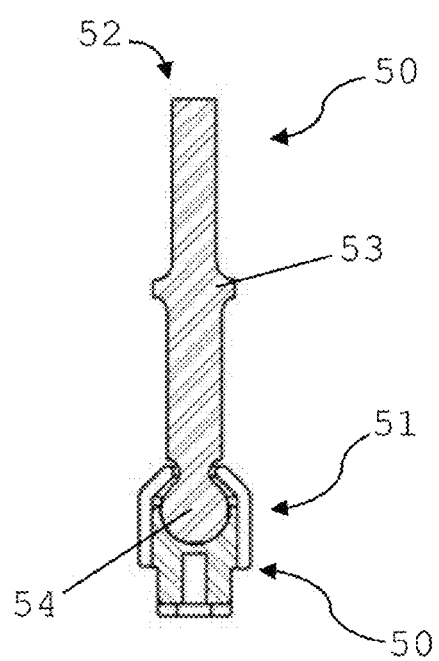
FIG. 4 shows a side sectional view of a rod inserted into the cap of FIGS. 2 and 3.

FIG. 4 shows a side sectional view of a cylindrical rod 50 inserted through the resilient opening 44 of the cap 40 of FIGS. 2 and 3. The rod 50 comprises a first end 51 with a ball impact member 54. The ball impact member 54 is located within the hollow section 45 of the cap 40. Along the length of the rod, towards a second end 52, is a flared portion 53 where the rod has a portion with a larger diameter than the rest of the rod. This flared portion 53 is for securing to a rivet gun 60.

Figure 5:
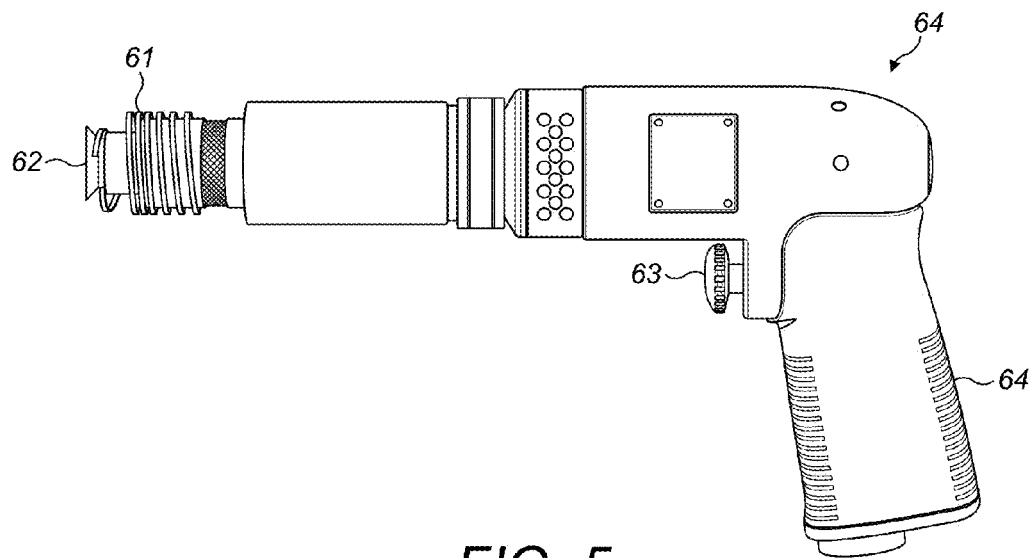
FIG. 5 shows a side view of a rivet gun for use with the rod and cap in FIG. 4.

FIG. 5 shows a side view of the rivet gun 60. The rivet gun 60 comprises an impact driver 62 adjacent to an attachment wire 61. It is the attachment wire 61 that clips over the flared portion 53 of the rod 50 to secure the rivet gun 60 to the rod 50 so that the impact driver 62 can impact on the second end 52 of the rod. The rivet gun 60 also comprises a user handle 64 and an on-off switch 63.

Figure 6:
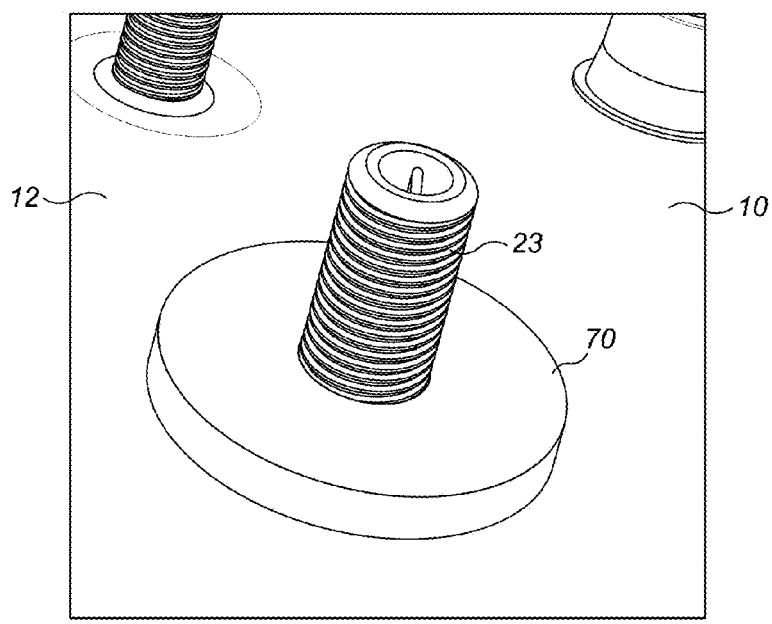
FIG. 6 shows a perspective view of the bolt of FIG. 1 in a component, with a protective washer over the bolt tail.

FIG. 6 shows a perspective view of the bolt 20 of FIG. 1 in the component 10, with a protective washer 70 over the bolt tail 23, resting on the rear/tail side 12 of the component. The protective washer 70 is made from ethylene propylene diene monomer (EPDM) and is resilient to prevent damage occurring to the component 10. It has a thickness of 3.5 mm. It has an internal diameter corresponding to the diameter of the bolt tail 23.

Figure 7:
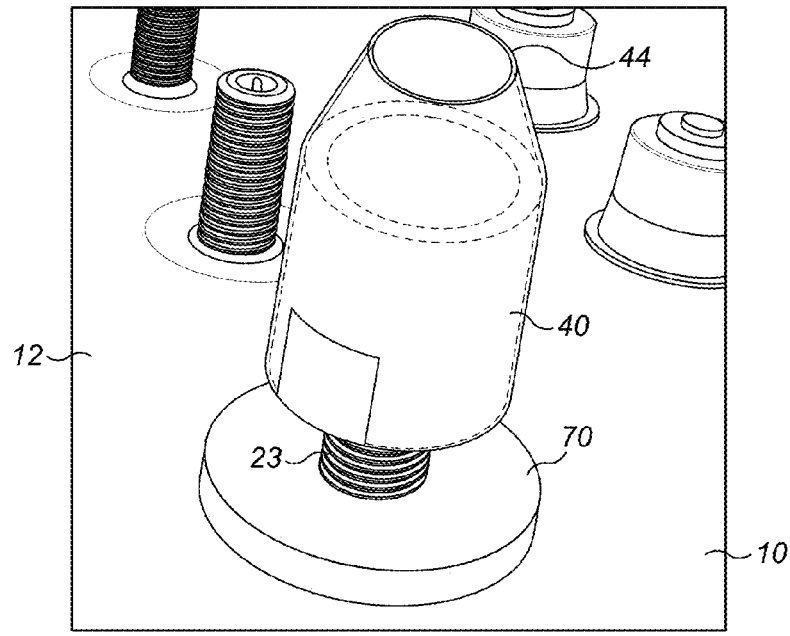
FIG. 7 shows a view of the arrangement of FIG. 6 with the cap of FIG. 2 screwed onto the bolt tail with hidden detail of the inside of the cap 40 also shown.

FIG. 7 shows a view of the arrangement of FIG. 6 with the cap 40 of FIG. 2 screwed onto the threaded section 24 of the bolt tail 23. The resilient opening 44 of the cap is at the back of the arrangement, facing away from the rear/tail side 12 of the component 10.

Figure 8:
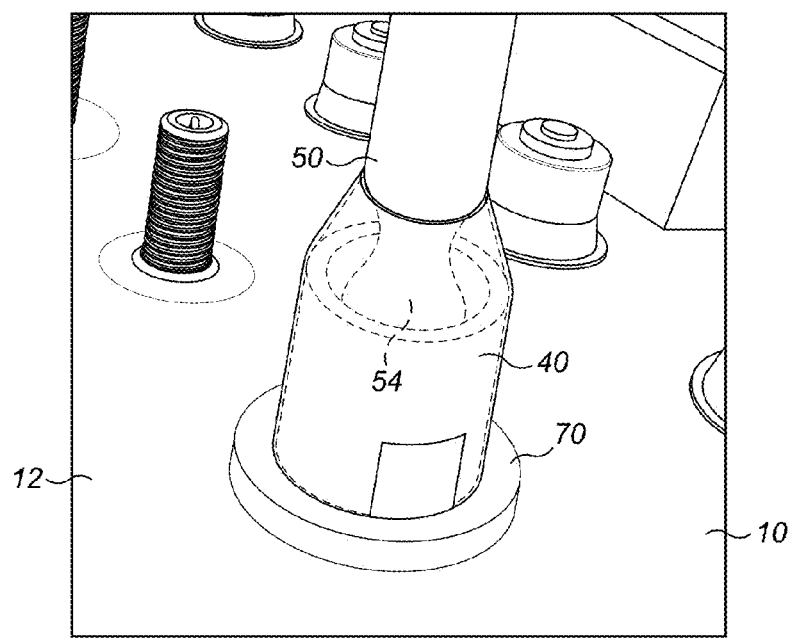
FIG. 8 shows a view of the arrangement of FIG. 7 with the rod of FIG. 4 inserted into the cap with hidden detail of the inside of the cap 40 also shown.

FIG. 8 shows a view of the arrangement of FIG. 7 with the ball impact member 54 of the rod 50 of FIG. 4 inserted into the resilient opening 44 of the cap 40. At least part of the ball impact member 54 is inserted through the resilient opening 44 and located in the adjacent hollow section 45 of the cap. As can be seen in FIG. 8, the rod 50 can rotate with respect to the cap 40. In addition, the rod 50 can be moved in and out (i.e. towards and away from the rear/tail side 12 of the component 10) in relation to the cap 40. This means that the amount of the ball impact member 54 received in the hollow section 45 can vary.

When the maximum amount of ball impact member 54 is received in the hollow section 45 of the cap 40 (i.e. when the rod 50 is at its extreme position nearest to the rear/tail side 12 of the component 10), the ball impact member 54 impacts against the bolt tail 23 of the bolt 20. When the minimum amount of ball impact member 54 is received in the hollow section 45 (i.e. when the rod 50 is at its extreme position furthest away from the rear/tail side 12 of the component 10), the ball impact member 54 is only partly located in the hollow section 45, as shown in FIG. 8. However, more than half of the ball impact member 54 is located within the hollow section 45, which means the widest point of the ball impact member 54 is inside the resilient opening 44, thus preventing the rod 50 from separating from the cap 40.

Figure 9:
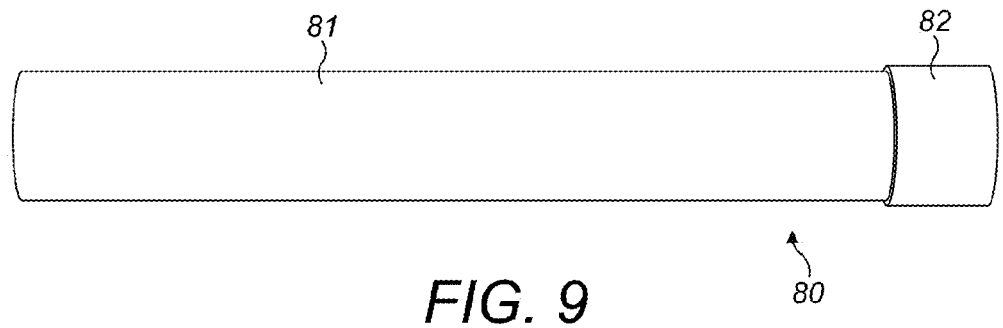
FIG. 9 shows a side view of a sleeve removal dowel.

FIG. 9 shows a side view of a sleeve removal dowel 80 for use in removing the sleeve 30 from the component 10. The dowel 80 comprises a cylindrical shaft 81 and an enlarged end portion 82. The enlarged end portion has a diameter slightly larger than the rest of the dowel. The diameter of the cylindrical shaft 81 corresponds to the internal diameter of the sleeve 30 and the enlarged end portion has a diameter corresponding to the external diameter of the sleeve 30. At the opposite end to the enlarged end portion 82, the shaft 81 has an internally threaded section (not shown).

Figure 10:
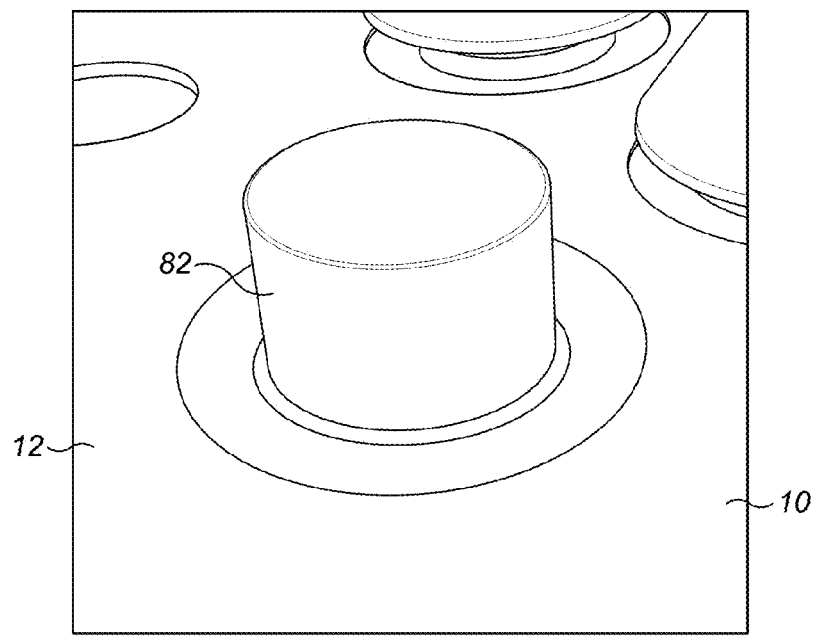
FIG. 10 shows a perspective view of the sleeve removal dowel of FIG. 9 inserted into the component.

FIG. 10 shows a perspective view of the sleeve removal dowel 80 of FIG. 9 inserted into the component 10. This figure shows the rear/tail side 12 of the component 10 (where the bolt tail 23 was), with the enlarged portion 82 of the sleeve removal dowel 80 resting on the sleeve 30 and protruding from the rear/tail side 12 of the component 10. The shaft 81 of the dowel 80 is located through the sleeve 30 and protrudes out of the front/head side 11 of the component 10 (not seen in FIG. 10).

In use, in order to remove the bolt 20 from the component 10, the following steps are carried out:

1) The nut (not shown) is unscrewed from the bolt tail 23 using a nut runner, a torque bar and a ratchet (not shown),
2) Any washers (not shown) under the nut are pulled off the bolt tail 23,
3) The protective washer 70 is paced over the bolt tail 23,
4) The cap 40 is screwed onto the bolt tail 23 until it is finger tight,
5) The rivet gun 60 is secured to the rod 50 by securing the attachment wire 61 of the rivet gun over the flared portion 53 of the rod,
6) The ball impact member 54 of the rod is pushed through the resilient opening 44 of the cap, into the hollow section 45 of the cap,
7) The rivet gun 60 is turned on gradually and repeated impacts are directed onto the bolt tail 23 until the seizing of the bolt head taper 21 has been released. The power from the rivet gun 60 is reduced as movement of the bolt 20 is felt, in order to reduce the impact on the component 10,
8) The ball impact member 54 is pulled out of the resilient opening 44 of the cap,
9) The cap 40 is unscrewed from the bolt tail 23 using an adjustable spanner,
10) The protective washer 70 is removed from the bolt tail 23, and
11) The bolt 20 is removed from the component 10 by pushing the bolt tail 23 into the rear/tail side 12 of the component 10 until the bolt head 21 protrudes from the front/head side 11 of the component and then the protruding bolt head 21 is pulled out of the front/head side 11 of the component.

In use, in order to then remove the sleeve 30 from the component 10, the following steps are carried out:

12) The shaft 81 of the sleeve removal dowel 80 is inserted into the sleeve 30 from the rear/tail side 12 of the component 10 until the enlarged portion 82 abuts the sleeve 30 and is left protruding from the rear/tail side 12 of the component,
13) A mandrel (not shown) is screwed into the internally threaded section of the shaft 81 of the sleeve removal dowel 80 at the front/head side 11 of the component 10,
14) A spacer bush (not shown) is placed over the mandrel and onto the front/head side 11 of the component 10, and
15) A hydraulic puller tool (not shown) is used to pull on the mandrel, and thereby pull on the shaft 81 of the sleeve removal dowel 80, the enlarged portion 82 of the sleeve removal dowel 80 and push the sleeve 30 out of the front/head side 11 of the component 10.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

Any type of percussive tool could be used, for example a pneumatic hammer could be used, instead of the rivet gun.

The percussive tool could come with an integral impact member, rather than subsequently being attached to a rod with an impact member.

The impact member could be any suitable shape, for example a hemisphere, a square or a diamond shape could be used.

The cap could be made from any suitable resilient material, such as plastic or rubber. Alternatively, the cap could just be made from a metallic material.

The protective washer could be made from any suitable material, such as plastic or rubber. It may also be any suitable shape or dimension.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method for removing a fastener from a component, the fastener comprising an end portion exposed from the component, the end portion having a threaded section, the method comprising the following steps;
   providing a cap with a threaded opening,
   screwing the threaded opening of the cap onto the threaded section of the exposed end portion of the fastener, and
   securing a percussive tool to the cap, such that repeated impacts from the percussive tool are directed onto the exposed end portion of the fastener, wherein the percussive tool is secured to the cap by securing an impact member, which is secured to the percussive tool, in a hollow section of the cap, such that the impact member is adjacent to the exposed end portion of the fastener, and, whereby the impact member is rotatable inside the hollow section of the cap.

2. A method for removing a fastener from a component, as claimed in claim 1, wherein the fastener is a bolt and wherein the method also comprises the step of unscrewing a nut from the exposed threaded section of the bolt.

3. A method for removing a fastener from a component, as claimed in claim 1, whereby the impact member is secured to the percussive tool.

4. A method for removing a fastener from a component, as claimed in claim 3, whereby the impact member is moveable inside the hollow section, to and from the exposed end portion of the fastener.

5. A method for removing a fastener from a component, as claimed in claim 3, whereby the percussive tool is secured to the cap by pushing the impact member through a resilient opening in an end of the cap into the hollow section of the cap.

6. A method for removing a fastener from a component, as claimed in claim 1, wherein the impact member is located on a rod and whereby the rod is secured to the cap by securing the impact member in the hollow section of the cap, such that the impact member is adjacent to the exposed end portion of the fastener.

7. A method for removing a fastener from a component, as claimed in claim 6, whereby the percussive tool is secured to the cap by the rod, the rod being secured to the cap and also secured to the percussive tool.

8. A method for removing a fastener from a component, as claimed in claim 1, whereby the method comprises the step of placing a protective washer around the exposed end portion of the fastener prior to screwing the threaded opening of the cap onto the exposed end portion of the fastener.

9. A method for removing a fastener from a component, as claimed in claim 1, whereby the method comprises the step of also removing a sleeve from the component by locating a sleeve removal dowel in the sleeve and pulling the sleeve removal dowel and the sleeve out of the component.

10. A method for removing a fastener from a component, as claimed in claim 1, whereby the method comprises using the cap.

11. A cap for use in removing a fastener from a component, the cap comprising a first end and a second end;
    a threaded opening in the first end for screwing onto a threaded section of an exposed end portion of the fastener, and
    an attachment portion for securing a percussive tool to the cap, wherein the attachment portion of the cap comprises a hollow section located between the first and second end for receiving a portion of an impact member therein such that, in use, the impact member is adjacent to the exposed end portion of the fastener, the second end at least partly closing off the hollow section at a periphery of the second end of the cap and thereby preventing the tool from detaching from the cap while allowing the impact member to be rotatable inside the hollow section of the cap, such that, in use, repeated impacts from the percussive tool are directed onto the exposed end portion of the fastener via a portion of the impact member located in the hollow section.

12. A cap for use in removing a fastener from a component, as claimed in claim 11, wherein the cap comprises a resilient opening to the hollow section.

13. A tool assembly comprising a cap as claimed in claim 11, and an impact rod for connecting to the cap and to a percussive tool, the impact rod comprising the impact member.

14. A cap for use in removing a fastener from a component, the cap comprising;
    a threaded opening for screwing onto a threaded section of an exposed end portion of the fastener, and
    an attachment mechanism for attaching a percussive tool to the cap and preventing the tool from detaching from the cap while allowing the tool to be rotatable inside a hollow section of the cap, such that, in use, repeated impacts from the percussive tool are directed onto the exposed end portion of the fastener.

* * * * *